United States Patent [19]

Uemoto et al.

[11] 4,000,988
[45] Jan. 4, 1977

[54] LOW-TEMPERATURE STEAM REFORMING PROCESS FOR HYDROCARBONS

[75] Inventors: Kunihiko Uemoto; Satoru Shichiji; Yoshinori Amemiya, all of Yokohama, Japan

[73] Assignees: Japan Gasoline Co., Ltd.; Nikki Chemical Co., Ltd., both of Tokyo, Japan

[22] Filed: Apr. 29, 1975

[21] Appl. No.: 572,634

Related U.S. Application Data

[63] Continuation of Ser. No. 430,741, Jan. 4, 1974, abandoned.

[30] Foreign Application Priority Data

June 20, 1973 Japan ............... 48-68718

[52] U.S. Cl. .................. 48/214 A; 252/373; 252/443; 252/457; 252/465
[51] Int. Cl.² ................. C10G 11/28; C01B 2/16
[58] Field of Search ............ 48/214; 252/373, 473, 252/443, 457, 465; 423/654

[56] References Cited
UNITED STATES PATENTS

| | | | |
|---|---|---|---|
| 3,429,680 | 2/1969 | Watanabe et al. ............ | 48/214 |
| 3,477,832 | 11/1969 | Mayland et al. ............ | 48/214 |
| 3,533,963 | 10/1970 | Senes et al. ............ | 48/214 |
| 3,567,411 | 3/1971 | McMahon ............ | 48/214 |
| 3,744,981 | 7/1973 | Ward ............ | 48/214 |
| 3,840,356 | 10/1974 | Bernussett et al. ............ | 48/214 |

Primary Examiner—S. Leon Bashore
Assistant Examiner—Peter F. Kratz
Attorney, Agent, or Firm—Woodhams, Blanchard and Flynn

[57] ABSTRACT

A process of manufacturing a methane-containing gas, which comprises introducing a feed hydrocarbon having at least 2 carbon atoms per molecule and steam preheated at a temperature in the range of 250° – 600° C into a steam reforming reactor (or reactors) packed with a nickel-containing catalyst which has been prepared so that a solid solution consisting of a nickel oxide and magnesia is contained therein and further a copper-chromium oxide or a copper-chromium-manganese oxide is contained therein and effecting steam reforming reaction of said hydrocarbons while maintaining the temperature of the catalyst bed of said reactor(s) in the range of 300° – 600° C.

11 Claims, 5 Drawing Figures

LOW-TEMPERATURE STEAM REFORMING PROCESS FOR HYDROCARBONS

This is a continuation of application Ser. No. 430,741, filed Jan. 4, 1974 and now abandoned.

BACKGROUND OF THE INVENTION

1. Field of the Invention

The present invention relates to a process of catalytic steam reforming of hydrocarbons having at least 2 carbon atoms per molecule at a temperature in the range of 300°–600° C, and to be more precise, it relates to a process of manufacturing a methane-containing gas — particularly a methane-rich gas — by, for instance, adiabatically steam reforming the material hydrocarbon in the presence of an improved catalyst comprising a nickel component and a magnesia component (hereinafter called 'a nickel-magnesia catlayst' for short) which is capable of demonstrating superb effects in the low-temperature steam reforming reaction.

2. Description of the Prior Art

There have hitherto been proposed a variety of nickel-containing catalysts for use in low-temperature steam reforming of the feed hydrocarbon. To cite instances, there are Japanese Pat. No. 11047/1965 teaching a catalyst consisting of nickel-alumina-lanthanide rare earth, Japanese Pat. No. 11048/1965 teaching a catalyst consisting of nickel-alumina-iron and Japanese Pat. No. 19174/1970 teaching a catalyst consisting of nickel-alumina-alkaline earth metal.

However, the conventional nickel-containing catalysts — including the above cited catalysts — for use in low-temperature steam reforming are not always satisfactory from the view point of the life of catalyst. Especially in the case of serving for the low-temperature steam reforming reaction under the condition of high pressure which has become popular of late, they are incapable of stable retention of their catalytic properties for a long period of time because of deposition of carbonaceous matters thereon and other factors. Moreover, inasmuch as the conventional nickel-containing catalysts are poisoned by a sulfur-containing contaminant, in the case of treating feed hydrocarbons containing relatively much sulfur compounds, it has been required to subject said feed hydrocarbon to a pre-treatment process for desulfurization under severe conditions.

SUMMARY OF THE INVENTION

The present invention is intended to provide a process of manufacturing a methane-containing gas, which comprises introducing a feed hydrocarbon having at least 2 carbon atoms per molecule and steam, pre-heated at a temperature in the range of 250°–600° C, at the ratio of said steam to said hydrocarbons in the range of 0.9 – 5.0 into a steam reforming reactor (or reactors) packed with either a nickel-containing catalyst which has been prepared so that a solid solution consisting of a nickel oxide and magnesia is contained therein, the atomic ratio of nickel to magnesium (Ni/Mg) therein is in the range of 0.05 –7.0, preferably 0.5 –5.0, and a copper-chromium oxide or a copper-chromium-manganese oxide is contained therein to the extent of less than 25 wt.% preferably 10 –20 wt.%, relative to the content of nickel in terms of metal, or a nickel-containing catalyst which has been prepared so that the foregoing catalyst composition is supported on an inorganic refractory carrier inert to said nickel component and magnesia component and the content of said carrier is less than 70 wt. % relative to the whole amount of the catalyst, and effecting steam reforming reaction of said hydrocarbons under the pressure for reaction in the range of 10 – 100 Kg/cm$^2$.G while maintaining the temperature of the catalyst bed of said reactor(s) in the range of 300°– 600° C, preferably 400° – 570° C.

BRIEF DESCRIPTION OF THE DRAWING

Referring to the appended drawings.

DETAILED DESCRIPTION OF THE INVENTION

With a view to making up for the drawbacks in the prior art as discussed above, Akio Okagami, Kunihiko Uemoto and Kouichi Satoh have previously proposed in Ser. No. 430,711, filed Jan. 4, 1974, now abandoned and replaced by Ser. No. 564,303, filed Apr. 2, 1975 a low-temperature steam reforming process for hydrocarbons employing a novel nickel-containing catalyst comprising a nickel component and a magnesia component and further containing a copper-chromium oxide or a copper-chromium-manganese oxide.

The present invention is intended to provide a further improved low-termperatrure steam reforming process for hydrocarbons which renders it possible to perform a low-temperature steam reforming reaction stably over a further long period of time even under the condition of high pressure. The fundamental feature of the present invention lies in the employment of a catalyst comprising a solid solution consisting of a nickel oxide and magnesia as the reforming catalyst. In other words, according to the knowledge of the inventors of the present invention, though the nickel-containing catalyst disclosed in said Ser. No. 564,303 is indeed superior to the conventional nickel-containing catalysts for use in reforming in properties such as sulfur resistance and durability under the condition of high pressure, that is, in respect of the catalytic life, said durability of catalyst can be further enhanced by virtue of the presence of a solid solution consisting of a nickel oxide and magnesia in said previously proposed catalyst.

Generally speaking, in the case of a catalyst wherein the catalyst components are present in the form of a solid solution, improvement of the durability thereof can be expected, but on the other hand, the activity of catalyst tends to decrease in a way because of the active component thereof being in the form of a solid solution. This tendency is admittedly anticipated also in the case of the nickel-containing catalyst disclosed also in the case of the nickel-containing catalyst disclosed in said separate patent application, but the inventors of the present invention have come to the finding that such deterioration of the activity can be well made up for by adding a copper-chromium oxide or a copper-chromium-maganese oxide thereto, that is , the low-temperature steam reforming process according to the present invention rather excels the previously proposed process in that it renders it possible to perform a stable steam reforming over a long period of time.

The present invention is to provide two processes of low-temperature steam reforming for hydrocarbons: the first reforming process is characterized in that, in a low-temperature steam reforming process for hydrocarbons for the purpose of manufacturing a methane-containing gas by making hydrocarbons having at least 2 carbon atoms per molecule as preheated at a temperature in the range of 250°–600° C react with steam at a temperature in the range of 300° – 600° C, preferably 400°–570° C, in the presence of a nickel-containing catalyst, said nickel-containing catalyst is to be a nickel-magnesia composition containing a solid solution consisting of a nickel oxide and magnesia, wherein the atomic ratio of nickel to magnesium is in the range of 0.05 – 7.0, and further containing a copper-chromium oxide or a copper-chromium-manganese oxide to the extent of less than 25 wt. % relative to the content of nickel in terms of metal; the second low-temperature steam reforming process is characterized in that, in the foregoing first reforming process, said nickel-magnesia composition consists of a nickel component and a magnesia component as supported on an inorganic refractory carrier and the content of said carrier is less than 70 wt. % relative to the whole amount of the catalyst.

To elucidate the nickel-magnesia composition constituting the essential component of the catalyst for use in the foregoing two process of low-temperature steam reforming under the present invention, this composition contains a solid solution in the sense of the word usually used in the field of inorganic chemistry, and this solid solution is composed of a nickel oxide and magnesia. The presence of this solid solution can be detected by X-ray diffraction, and when a nickel-magnesia composition according to the present invention is subjected to X-ray diffraction employing, for instance, Cu$K\alpha$, the presence of a NiO—MgO solid solution can be detected between the peak of MgO and the peak of NiO.

In the nickel-magnesia composition under the present invention, the atomic ratio of nickel to magnesium is in the range of 0.05 – 7.0 preferably 0.5 – 5.0, –5.0, and this atomic ratio is to be figured out by taking the nickel component and magnesium component, if present, into account. In this connection, a magnesium component not turned to a solid solution consists substantially of active magnesia. And, in the case where this atomic ratio of Ni/Mg is less than 0.05, a satisfactory activity in low-temperature steam reforming cannot be expected, while in the case where said atomic ratio of Ni/Mg exceeds 7.0, deposition of carbonaceous matters becomes remarkable with the passage of time in the low-temperature steam reforming reaction, developing the tendency of the catalytic activity to decrease.

The nickel-magnesia composition under the present invention further contains a copper-chromium oxide or a copper-chromium-manganese oxide, and the content of said oxide is to be less than 25 wt. %, preferably in the range of 10 – 20 wt. %, relative to the content of nickel in terms of metal. The chemical composition or the state of oxidation of these metal oxides do not pose any particular problem in the present invention, but as for the cooper-chromium oxide said oxide is desirably present in the form of a copper chromite to be expressed by the structural formula $Cu_2Cr_2O_5$. In this connection, manganese is a component for further improving the catalytic activity under the present invention due to the co-existence with said copper-chromium component.

As for the way of supporting the foregoing nickel-magnesia composition on a carrier, said composition can be employed for the low-temperature steam reforming reaction by supporting it on an inorganic refractory carrier inert against the nickel component as well as the magnesium component thereof, and the appropriate amount of said carrier to be employed on this occasion is less than 70 wt. % relative to the whole amount of the catalyst. The 'carrier inert against nickel component as well as magnesium component' herein means a carrier free of chemical reaction with the nickel component and magnesium component of said composition. To cite concrete example of such a carrier, there are $\alpha Al_2O_3$, SiC, $\alpha$-quartz, $ZrO_2$, etc. In this connection, $\gamma$-$Al_2O_3$, silica gel, kaolin, etc. popular as curries for use in the conventional catalysts for low-temperature steam reforming are unfit for use as the carrier for the catalysts under the present invention, particularly under a high pressure.

The low-temperature steam reforming process according to the present invention is the steam reforming of the feed hydrocarbon having at least 2 carbon atoms per molecule by employing the foregoing nickel-magnesia composition, or said composition as supported on a specific carrier, as the reforming catalyst at a temperature in the range of 300°– 600° C and under a pressure in the range of 10 – 100 Kg/cm².G. In this case, even when the feed hydrocarbon contains sulfur compounds to the extent of 10 – 20 ppm or thereabouts, steam reforming can be performed without difficulties, according to the present invention. And, the refinery off gas, LPG, light naphtha, heavy naphtha and kerosene are typical feed hydrocarbons to be subjected to steam reforming in the present invention. The ratio of steam to the feed hydrocarbon on the occasion of steam reforming is desirably in the range of 0.9 – 5.0 in terms of $H_2O/C$ (that is, the number of moles of steam per carbon atom of the feed hydrocarbons). Further, in the case of steam reforming of a material hydrocarbon having a relatively large content of sulfur compounds or steam reforming under the condition of a relatively high pressure such as in the range of 50 – 100 Kg/cm².G, employment of a catalyst prepared by supporting said nickel-magnesia composition on the foregoing carrier can bring on a more satisfactory result.

Hereunder exemplified are methods of manufacturing reforming catalysts applicable to the steam reforming process under the present invention, but it goes with saying that the reforming catalysts for use in the present invention are not limited to those produced by these methods.

Method of manufacturing catalysts:

1. Method of manufacturing a catalyst through co-precipitation process:

An aqueous solution of a nickel salt selected from $Ni(NO_3)_2$, $NiSO_4$, $NiCl_2$, $Ni(CH_3COO)_2$, $Ni(HCOO)_2$ and the like, an aqueous solution of a magnesium salt selected from $Mg(NO_3)_2$, $MgSO_4$, $MgCl_2$, $Mg(CH_3COO)_2$, $Mg(HCOO)_2$ and the like and an aqueous solution of an alkali selected from NaOH, KOH, $Na_2CO_3$, $K_2CO_3$ and the like are admixed so that the atomic ratio of Ni component to Mg component for the resulting catalyst is in the range of 0.05 – 7.0 under the condition of the temperature being in the range of from room temperature to 90° C, preferably 30°– 70° C, thereby precipitating a hydroxide or basic carbonate of Ni and Mg. This mixture solution is mixed by stirring for appropriate time — for instance, 0.5 – 3 hours — while being held at a fixed temperature as above, thereby aging said precipitate. Thereafter, the thus aged precipitate is filtered and then washed with a large quantity of water or, of desired, hot water. Next, after adding thereto an ammonium double salt or oxide, for instance, a copper-chronium mixture having the atomic ratio of 1:1 (or a copper-chromium-manganese mixture having the atomic ratio of 1:1:0.1), this precipitate was dried at a temperature in the range of 40°]– 130°C, mixed with less than 10 wt. % of a molding assistant such as graphite, stearic acid, etc. and molded into 0.5 – 20 mm × mm φ tablets by means of a tablet machine. This tablet is then calcined under appropriate conditions for calcination as defined later on, whereby a reforming catalyst according to the present invention is produced.

Further, if a catalyst supported on a carrier is desired, it can be produced by adding the aforesaid specific carrier (having a grain size of less than 200 meshes) to said mixture solution intended to give rise to precipitation therein to the extent of less than 70 wt. % relative to the whole amount of the catalyst and applying the same procedures as above subsequent thereto.

2. Method of manufacturing a catalyst through deposition process:

A commerical active MgO powder for industrial use, the same nickel salt and alkaline aqueous solution as those defined in the foregoing method [1] are admixed under the condition of the temperature being in the range of from room temperature to 90° C, preferably 30° – 70° C, upon regulating the atomic ratio of Ni to Mg for the catalyst to be in the range of 0.05 – 7.0, thereby precipitating a hydroxide or basic carbonate of Ni to deposit on the surface of MgO. The thus deposited precipitate is then filtered and washed in the same way as defined in the method [1] and admixed with a prescribed amount of a copper-chromium ammonium double salt or oxide or a copper-chromium-manganese ammonium double salt or oxide. The resulting mixture is dried, molded and calcined in the same way as in the method [1], whereby a reforming catalyst under the present invention is obtained. If a catalyst supported on a carrier desired, it can be produced by adding a fixed amount of the aforesaid specific carrier to the precipitate thus filtered and washed.

3. Method of manufacturing a catalyst through wet mixing process:

The same nickel salt and alkaline aqueous solution as defined in the method [1] are admixed under the condition of the temperature being in the range of from room temperature to 90° c, preferably 30° – 70° C, thereby precipitating a hydroxide or basic carbonate of Ni. This precipitate is then subjected to mixing by stirring under a desired fixed condition of temperature as set forth above, followed by filtration and washing under the same condition of operation as in the method [1]. To the thus treated precipitate is added a commerical active MgO powder for industrial use so that the atomic ratio of Ni to Mg is in the range of 0.05 – 7.0 and mixed thoroughly. The resulting mixture, after adding thereto a prescribed amount of a copper-chromium ammonium double salt or oxide or a copper-chromium-manganese ammonium double salt or oxide, is dried, molded and calcined in the same way as defined in the method [1], whereby a reforming catalyst under the present invention is obtained. In the case of employing a carrier, said carrier can be added to the foregoing mixture of precipitate and MgO powder.

4. Method of manufacturing a catalyst through an applied process:

Upon preparing a catalyst composition by any one of the foregoing methods [1],[2] and [3] this composition is suited for use as the reforming catalyst as it is), this composition is either dipped in an aqueous solution of a nickel salt again or admixed with the same precipitate of a hydroxide or basic carbonate of Ni and Mg as defined in the method [1]. Subsequently, the resulting mixture is again dried, molded and calcined, whereby a nickel-magnesia catalyst comprising a nickel component which is readily convertible into metal nickel when subjected to reduction treatment and a solid solution is prepared. According to this method, the condition for calcination, for instance, the temperature for calcination , at the time of manufacturing a catalyst composition is not so strictly limited; that is, it is allowed to bring on a hardly reducible solid solution.

CONDITIONS FOR CALCINATION

In manufacturing a catalyst according to the present invention, selection of the conditions for calcination constitutes an important factor. In other words, the conditions for calcination in the present invention must be determined in due consideration of such matters as what state of mixing of the nickel component and magnesia component is held in the catalyst composition prior to calcination, and so on.

Generally speaking, application of a high temperature by calcination and a long time for calcination renders it easy to form a solid solution in the catalyst. However, an excessive calcination will make the resulting catalyst hard to reduce, and is rather undesirable also from the view point of catalytic activity.

In the case of manufacturing a catalyst by the method [4], no question arises, but in the case of manufacturing a catalyst by the methods [1], [2] and [3], the state of mixing of a nickel salt and a magnesium salt becomes worse from the method [1] through the method [3], so that there is a necessity for applying a higher temperature or a longer time for calcination in order. Also in the case of employing the method [1], according to the way of selecting the material salt or the way of selecting the condition for precipitation, some catalyst will require calcination at a high temperature such as more than 700° C, while, for others, calcination at a lower temperature such as 3502 C or thereabouts will suffice. Further, there are instances where a solid solution cannot be formed unless a low-temperature, long-time treatment is applied.

In this connection, in the case where all factors other than the temperature for precipitation are stationary, if the precipitate is formed by applying a low temperature of, for instance 20° C, the temperature for calcination will suffice to be in the range of 300° –400° C, but if said temperature for precipitation is raised, the temperature for calcination will be required to be higher than this.

As discussed in the foregoing, selection of the conditions for calcination should always be made by taking into consideration many other factors at the time of manufacturing, namely, the material salt and the process of preparation thereof or the concentration of salt and temperature at the time of producing the precipitate, the time for aging the precipitate and so on, or combinations of these factors.

The temperature for calcination to be applied at the time of manufacturing a catalyst by the method [1]– method [4] is desirable to be in the range of 350°–1,2000° C, preferably 600°–800° C. In the case of the method [4], the initial calcination treatment may be conducted at a high temperature, but the calcination treatment subsequent to dipping in an aqueous solution of nickel salt and the like is desirable to be conducted at a temperature in the range of 300°–600° C.

Typical methods of manufacturing the catalyst under the present invention are as set forth in the foregoing, and the low-temperature steam reforming process according to the present invention is to be started at a point of time when a reforming catalyst manufactured by any of the foregoing methods [1]–[4] is packed in a steam reforming reactor (or reactors) and is activated by feeding hydrogen as the reducing gas stream at a temperature in the range of 300° – 600° C, preferably 400°–500° C, thereto. When said catalyst has been fully activated, feeding of hydrogen is discontinued, the aforesaid feed hydrocarbon and steam as preheated up to a temperature in the range of 250° – 600° C are introduced into said reactor(s) at the steam ratio of 0.9 – 5.0 in terms of $H_2O/C$ (mole/atom) and the steam reforming reaction of said feed hydrocarbons is effected while maintaining the temperature of the catalyst bed of said reactor(s) in the range of 300°–600° C, preferably 400°–570° C, whereby a methane-containing gas is produced.

The thus produced methane-containing gas usually contains more than 40% of methane on dry basis, coupled with such fellow components as hydrogen, carbon monoxide and carbon dioxide. Therefore, if desired, it is possible to produce a gas containing much more methane than above, which is suited for use as the fuel gas, by effecting methanation reaction of carbon oxides by feeding the gas stream coming out of said reforming reactor(s) to a methanation reactor(s).

DESCRIPTION OF THE PREFERRED EMBODIMENTS

Hereunder will be given further particulars of the present invention by reference to preferred examples of the present invention. To begin with, the conditions for manufacturing the catalysts for use in said examples are shown in the following Table - 1 through Table - 4. It is added that, the content of copper-chromium oxide or copper-chromium-manganese oxide and the atomic ratio of Ni to Mg shown in said Table - 1 – Table -4 represent a target value respectively, not the content of such oxides and the atomic ratio in the final catalyst.

Table 1

| Conditions for manufacturing | Conditions for manufacturing of catalyst by the method [1] | | | | | |
|---|---|---|---|---|---|---|
| | Symbol for catalyst | | | | | |
| | a-1 | a-2 | a-3 | a-4 | a-5 | a-6 |
| properties of liquid at the start of precipitation | alkaline | | | | | |
| salt selected | $NiSO_4$, $MgSO_4$, $Na_2CO_3$ | | | | | |
| temperature for precipitation | 40° C | | | | | |
| time for aging | 1 hr | | | | | |
| atomic ratio of Ni/Mg | 5 | 5 | 2 | 2 | 0.5 | 0.5 |
| temperature for calcination | 500° C | 550° C | 500° C | 500° C | 450° C | 500° C |
| molding | 3 mm × 3 mm φ tablet | | | | | |
| presence or absence of solid solution | absence | presence | presence | presence | absence | presence |
| amount of Cu.Cr oxide added | | 15 wt.% | | | | 5 wt.% |
| amount of Cu.Cr.Mn oxide added | | | | 15 wt.% | | |

Table 2

| Conditions for manufacturing | Conditions for manufacturing of catalyst by the method [2] | | | | |
|---|---|---|---|---|---|
| | Symbol for catalyst | | | | |
| | a-7 | a-8 | a-9 | a-10 | a-11 |
| properties of liquid at the start of precipitation | acidic | | | | |
| salt selected *1 | $NiSo_4$, $Na_2CO_3$ | | | | |
| temperature for precipitation | 40° C | | | | |
| time for aging | 1 hr | | | | |
| atomic ratio of Ni/Mg | 3 | 3 | 1 | 0.5 | 0.5 |
| temperature for calcination | 600° C | 700° C | 500° C | 500° C | 600° C |
| molding | 3 mm × 3 mm φ tablet | | | | |
| presence or absence of solid solution | absence | presence | presence | absence | presence |
| amount of Cu.Cr.Mn oxide added | | 5 wt.% | | | 15 wt.% |

*1 As the magnesium component, a commercial MgO is applied.

Table 3

Conditions for manufacturing of catalyst by method [4]

| Conditions for manufacturing | Symbol for catalyst | | |
|---|---|---|---|
| | a-12 | a-13 | a-14 |
| atomic ratio of Ni/Mg in solid solution *² | 0.5 | 0.2 | 0.1 |
| salt selected | Ni(NO₃)₂ | | |
| ratio of Ni/solid solution at the time of dipping | 5 wt.% | | |
| temperature for calcination | 350° C | 450° C | 350° C |
| molding | 3 mm × 3 mm φ tablet | | |
| amount of Cu.Cr. Mn oxide added | 15 wt.% | | |

*² This solid solution has been prepared in advance by calcination at 800° C according to the method [1].

Table 4

Conditions for manufacturing of catalyst supported on a carrier by the Method [1]

| Conditions for manufacturing | Symbol for catalyst | | | | | | | | | | | | |
|---|---|---|---|---|---|---|---|---|---|---|---|---|---|
| | b-1 | b-2 | b-3 | b-4 | b-5 | b-6 | b-7 | b-8 | b-9 | b-10 | b-11 | b-12 | b-13 |
| properties of liquid at the start of precipitation | alkaline | | | | | | | | | acidic | | | |
| salt selected | Ni(NO₃)₂, Mg(NO₃)₂, Na₂CO₃ | | | | | | | | | | | | |
| temperature for precipitation | 40° C | | | | | | | | | 60° C | | | |
| time for aging | 1 hr | | | | | | | | | 2 hrs | | | |
| atomic ratio of Ni/Mg | 5 | 5 | 5 | 5 | 2 | 2 | 2 | 0.5 | 0.5 | 2 | 2 | 2 | 2 |
| temperature for calcination | 500° C | 550° C | 550° C | 550° C | 500° C | 500° C | 500° C | 450° C | 500° C | 500° C | 500° C | 500° C | 500° C |
| molding | 3 mm × 3 mm φ tablet | | | | | | | | | | | | |
| presence or absence of solid solution | absence | presence | presence | presence | presence | presence | presence | absence | presence | presence | presence | presence | presence |
| carrier component | | | | | SiC | | | | | α-quartz | ZrO₂ | silica gel | γ-Al₂O₃ |
| content of carrier (wt.%) | 30 | 30 | 60 | 80 | 30 | 60 | 80 | 30 | 30 | 35 | 35 | 35 | 35 |
| amount of Cu.Cr.Mn oxide added | 10 wt.% | | | | | | | | | 15 wt.% | | | |

The properties of the carriers shown in Table - 4 above are as shown in Table - 5 below.

Table 5

| Carrier | Properties | | |
|---|---|---|---|
| | Purity | specific surface area | grain size |
| α-quartz | more than 99% | 2.0 m²/gr | less than 200 meshes |
| SiC | 90% (electrically fused product) | 1.0 | ″ |
| ZrO₂ | product obtained through calcination at 1500° C for 200 hrs. | 3.6 | ″ |
| γ-Al₂O₃ | more than 99% (commercial reagent) | 190 | ″ |
| SiO₂ gel | more than 99.5% (commercial reagent) | 600 | ″ |

EXAMPLE 1.

Upon activating those catalysts manufactured under the conditions shown in Table - 1 – Table - 4 above by subjecting them to 10 hours' reduction treatment within a hydrogen gas stream at 500° C respectively, 1 gr each of said catalysts was packed in a circulating reactor respectively. Subsequently, by supplying said reactor with a feed naphtha having the properties that IBP: 33° C, FBP: 122° C, $d_4^{15}$: 0.675, sulfur content: 0.2 ppm, C: 6.04, H: 13.4 at the rate of 35 gr/hr together with steam at the ratio of 2.0 in terms of $H_2O/C$ (mole/atom), steam reforming reaction was effected under the conditions of 500° C in temperature and 70 Kg/cm².G in pressure and under the conditor that 500° C in temperature and 10 Kg/cm².G in pressure, respectively. When the initial catalytic activity of each catalyst and the catalytic activity of same 1000 hours after the start of reforming reaction were evaluated on the basis of conversion respectively, the results were as shown in Table - 6 below.

Next, for the purpose of examining the change of properties of these catalysts, upon packing 25 cc each of said catalysts in an autoclave respectively, the aforesaid material naphtha was introduced into it at the rate of 30 gr/hr. The ratio of steam to the material naphtha, the temperature for reaction and the pressure for reaction on this occasion were set to be identical with those in the foregoing activity evaluation test. After taking out a portion of each catalyst 500 hours after the start of reaction, steam reforming reaction was continued for another 500 hours after the start of reaction and the sample of each catalyst picked 1000 hours after the start of reaction were respectively subjected to X-ray diffraction analysis to measure the degree of growth of crystallite in each catalyst. The results were also as shown in said Table - 6.

In the case of the foregoing catalytic activity evaluation test, in order to facilitate the comparison of catalytic activity, the conversion was controlled to be rather low by limiting the amount of catalyst employed. Therefore, if the amount of catalyst is increased so as to make the conversion almost 100%, it will be possible to obtain a product gas having such properties as follows through the process under the present invention.

In the case of steam reforming under the reaction condition of 70 Kg/cm².G:
$CH_4$: about 65 vol. %
$H_2$: about 12.5 vol %
CO: about 0.5 vol %
$CO_2$: about 22 vol. %

In the case of steam reforming under the reaction condition of 10 Kg/cm².G:
CH₂: about 56 vol. %
H₂: about 21 vol. %
CO: about 1 vol. %
CO₂: about 22 vol. % and b-13, also showed the same tendency as the foregoing catalysts not containing any solid solution. In this connection, said b-12 and b-13 had contained a solid solution at the start of reaction, but the presence of said solid solution could be no longer detected after their use for reforming reaction for a long time (say, 1000

Table 6

| Symbol for Catalyst | Conditions and effects Amount of Cu.Cr oxide or Cu.Cr.Mn oxide added (wt.%) | pressure for test (Kg/cm² .G) | growth of crystallite | | activity (conversion) | |
|---|---|---|---|---|---|---|
| | | | initial stage 500 hrs after | 500 hrs after 1000 hrs after | initial stage | 1000 hrs after |
| a-1 | 15 | 10 | medium | little | 63 | 38 |
| | | 70 | much | medium | 65 | 35 |
| a-2 | 15 | 10 | little | little | 62 | 59 |
| | | 70 | medium | little | 63 | 59 |
| a-3 | 15 | 10 | medium | little | 59 | 56 |
| | | 70 | much | little | 61 | 57 |
| a-4 | 15 | 10 | medium | little | 58 | 56 |
| | | 70 | much | little | 59 | 57 |
| a-5 | 5 | 10 | medium | little | 57 | 37 |
| | | 70 | much | medium | 59 | 35 |
| a-6 | 5 | 10 | little | little | 58 | 58 |
| | | 70 | medium | little | 60 | 57 |
| a-7 | 5 | 10 | medium | little | 59 | 39 |
| | | 70 | much | medium | 61 | 38 |
| a-8 | 5 | 10 | little | little | 62 | 59 |
| | | 70 | little | little | 63 | 59 |
| a-9 | 5 | 10 | little | little | 60 | 58 |
| | | 70 | little | little | 61 | 58 |
| a-10 | 15 | 10 | medium | little | 65 | 40 |
| | | 70 | much | medium | 66 | 39 |
| a-11 | 15 | 10 | little | little | 64 | 62 |
| | | 70 | medium | little | 64 | 61 |
| a-12 | 15 | 10 | little | nil | 49 | 47 |
| | | 70 | little | nil | 51 | 47 |
| a-13 | 15 | 10 | little | nil | 49 | 46 |
| | | 70 | little | nil | 50 | 47 |
| a-14 | 15 | 10 | little | nil | 49 | 46 |
| | | 70 | little | nil | 49 | 46 |
| b-1 | 10 | 10 | medium | little | 61 | 36 |
| | | 70 | much | medium | 63 | 36 |
| b-2 | 10 | 10 | little | little | 63 | 62 |
| | | 70 | medium | little | 64 | 62 |
| b-3 | 10 | 10 | little | little | 54 | 52 |
| | | 70 | medium | little | 56 | 53 |
| b-4 | 10 | 10 | medium | little | 39 | 27 |
| | | 70 | much | little | 42 | 27 |
| b-5 | 10 | 10 | medium | little | 58 | 54 |
| | | 70 | medium | little | 59 | 55 |
| b-6 | 10 | 10 | little | little | 53 | 51 |
| | | 70 | little | little | 55 | 53 |
| b-7 | 10 | 10 | medium | little | 38 | 27 |
| | | 70 | much | little | 42 | 28 |
| b-8 | 10 | 10 | medium | little | 58 | 40 |
| | | 70 | much | medium | 59 | 34 |
| b-9 | 10 | 10 | little | little | 58 | 57 |
| | | 70 | medium | little | 58 | 56 |
| b-10 | 15 | 10 | medium | little | 58 | 57 |
| | | 70 | medium | little | 58 | 56 |
| b-11 | 15 | 10 | little | little | 66 | 65 |
| | | 70 | little | little | 68 | 66 |
| b-12 | 15 | 10 | medium | little | 69 | 39 |
| | | 70 | much | much | 70 | 38 |
| b-13 | 15 | 10 | medium | little | 67 | 38 |
| | | 70 | much | much | 68 | 38 |

As is clear from Table - 6 above, in the case where those catalysts wherein no solid solution was present, namely, a-1, a-5, a-7, a-10, b-1 and b-8, were employed for effecting steam reforming reaction, there was observed not only an extreme growth of crystallite but also much deterioration of the catalytic activity 1000 hours after the start of reaction. When the catalysts containing 70 wt. % or more of carrier component to the total amount of the catalyst, namely, b-4 and b-7, were employed, there was observed lower catalytic activity even at the initiation of the reaction and also growth of crystallite. Further, those catalysts employing silica gel or γ-Al₂O₃ popular for use as the carrier component of the conventional catalysts, namely, b-12 hours). The reason for this extinction of solid solution is yet to be clarified, but it is indisputable that this extinction has a bad influence upon the activity of catalyst in a way. Example 2.

Upon producing the catalysts a-2, a-3, a-4, a-6, a-8, a-9, a-11, a-12, a-13, a-14, b-2, b-3, b-5, b-6, b-9, b-10 and b-11 under the same conditions for manufacturing as shown in the foregoing Table - 1 - Table - 4 except for modifying the amount of said coppper-chromium oxide or copper-chromium-manganese oxide to be in the range of 0 – 25 gr, 25 gr each of these catalysts were packed in a reforming reactor respectively and activated by 10 hours' reduction treatment in a stream of hydrogen gas at 500° C. Subsequently, by supplying said reactor with a material naphtha having the properties that IBP: 33° C, FBP: 122° C, $d_4^{15}$ 0.675, sulfur content: 13.5 ppm, C: 6.04, H: 13.4 at the rate of 80 gr/hr together with steam at the ratio of 2.0 in terms of $H_2O/C$ (mole/atom), steam reforming reaction was effected continuously for 200 hours under the conditions of 500°C in temperature and 70 Kg/cm$^2$.G in pressure.

Figure 1:
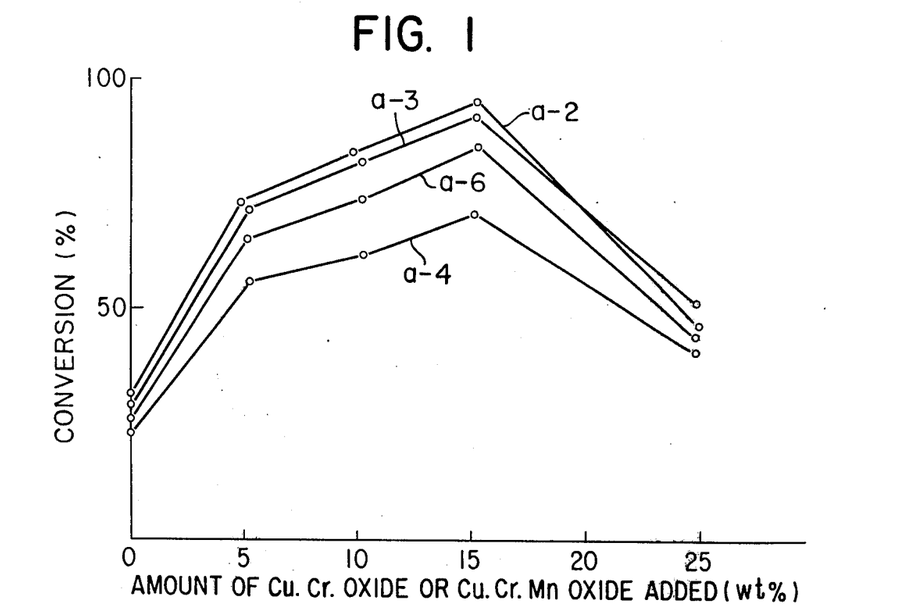
FIG. 1 – FIG. 5 are graphs illustrative of the relation between the content of a copper-chromium oxide or a copper-chromium-manganese oxide in the catalyst for use in steam reforming and the conversion.
Figure 2:
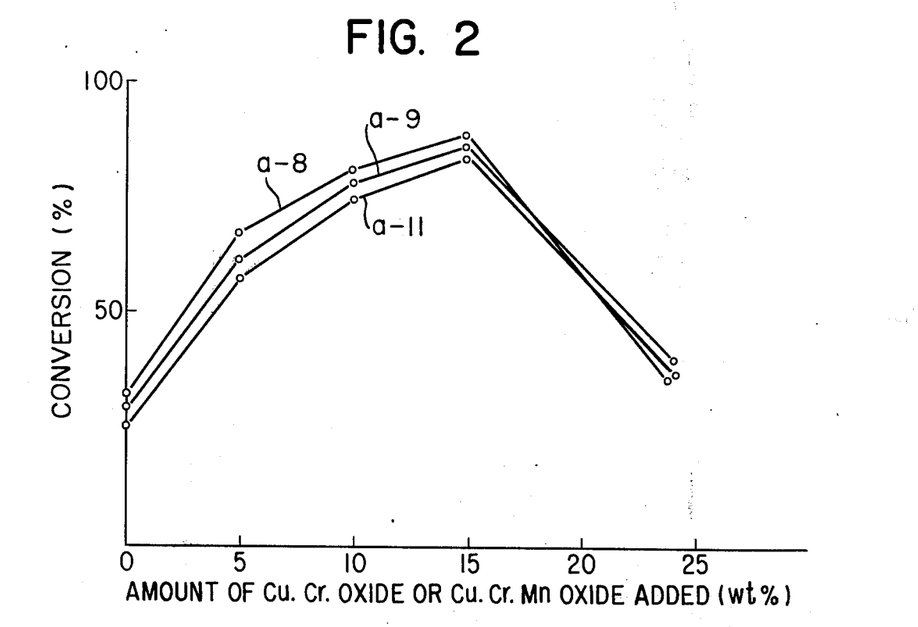
Figure 3:
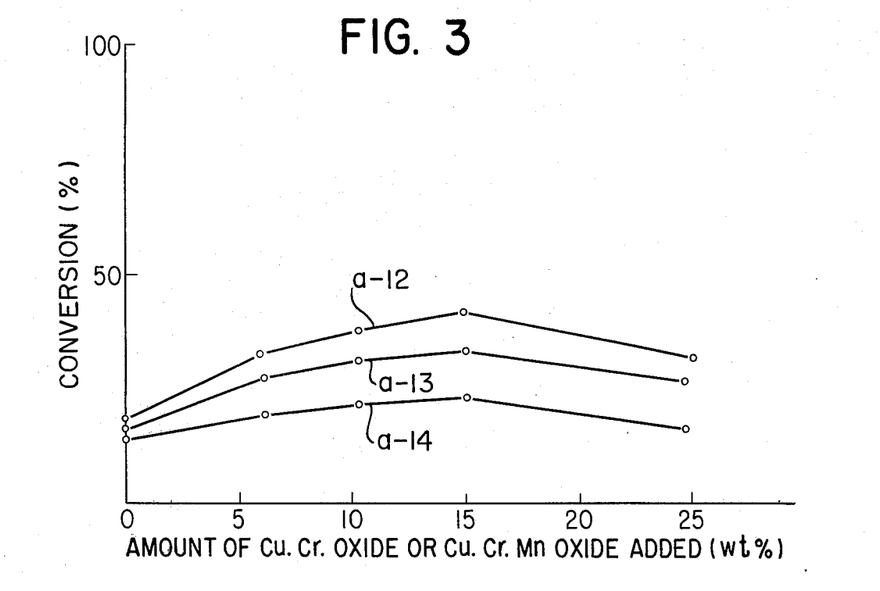
Figure 4:
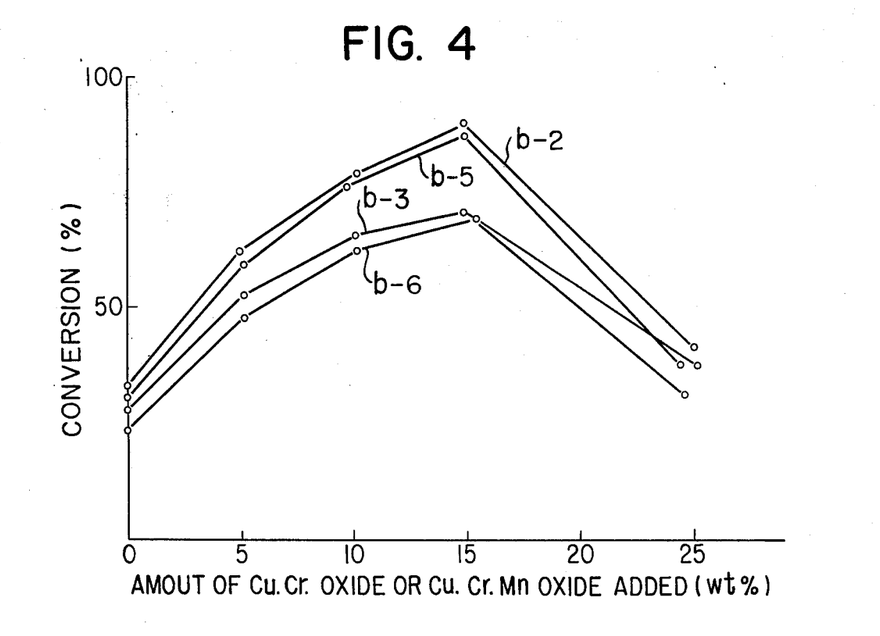
Figure 5:
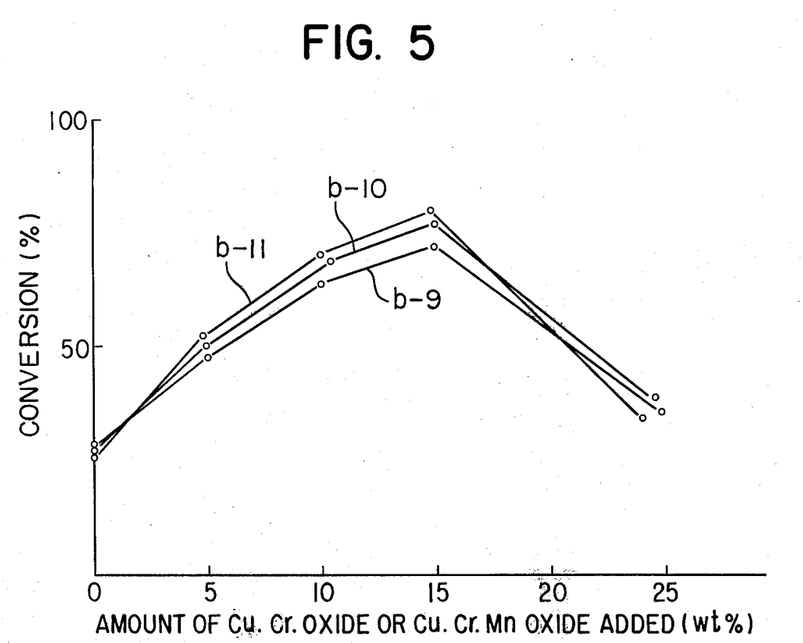

The relation between the content of said copper-chromium oxide or copper-chromium-manganese oxide in each catalyst and the conversion 200 hours after the start of reaction in this test was as shown in the appended FIG. 1 – FIG. 5. In this connection, the present example is for the purpose of evaluating the sulfur resistance of each catalyst by employing a feed naphtha containing relatively much sulfur compounds, and the conversion in the present example was deliberately controlled so as to facilitate comparison, like in the case of Example 1.

As is clear from said FIG. 1 – FIG. 5 too, those catalysts wherein a copper-chromium oxide or a copper-chromium-manganese oxide is contained to the extent of 5 – 20 wt. % — particularly 10 – 20 wt. % — relative to the content of nickel in terms of metal have proved excellent in sulfur resistance and capable of demonstrating a stable activity in low-temperature steam reforming over a long period of time.

What is claimed is:

1. In a process for manufacturing a methane-containing gas by subjecting steam-reformable feed hydrocarbons to adiabatic low-temperature steam reforming in the presence of a nickel catalyst, the improvement which comprises preheating a mixture of said feed hydrocarbon with steam mixed in the ratio of moles of steam to the number of moles of carbon atoms in said feed hydrocarbon in the range of 0.9 to 5.0 to a temperature in the range of 250° to 600° C, feeding the preheated mixture into a steam reforming reaction zone containing a catalyst composition consisting essentially of (A) a nickel-magnesia component in which the atomic ratio of Ni/Mg is in the range of 0.05 to 7.0 and which contains a solid solution consisting of nickel oxide and magnesia, (B) a member selected from the group consisting of a copper-chromium mixture in oxide form and a copper-chromium-manganese mixture in oxide form, the amount of component (B) being from 10 to 25 wt. % based on the nickel content, calculated as the metal, of component (A), and (C) up to 70 percent by weight, based on the combined weights of (A), (B) and (C), of a carrier substance selected from the group consisting of $\alpha$-$Al_2O_3$, SiC, $\alpha$-quartz and calcined $ZrO_2$, said catalyst composition having been calcined at a temperature in the range of 350° to 1200° C and effective to form said solid solution, and effecting steam reforming of said feed hydrocarbons by maintaining the temperature of the said catalyst in the range of 300° to 600° C and the pressure of the reaction zone being in the range of 10 to 100 kg/cm$^2$ G.

2. A process according to claim 1, in which said hydrocarbon is selected from the group consisting of refinery off gas, LPG, light naphtha, heavy naphtha and kerosene.

3. A process according to claim 2, in which said hydrocarbon contains a sulfur compound in the amount of 10 – 20 ppm.

4. A process according to claim 1, in which the atomic ratio of Ni/Mg in catalyst component (A) is in the range of 0.5 to 5.0.

5. A process according to claim 1, in which the content of catalyst component (B) contained in said catalyst composition is in the range of 10 to 20 wt. % based on the nickel.

6. A process according to claim 1, in which the calcination temperature is in the range of 600° – 800° C.

7. A process according to claim 1, in which said catalyst composition is prepared by a method consisting of dipping said calcined catalyst composition containing a solid solution consisting of nickel oxide and magnesia in an aqueous solution of a nickel salt and mixing said calcined catlayst composition with a hydroxide or basic carbonate of nickel or magnesium, and subsequently calcining the resulting mixture again at a temperature in the range of 300° to 600° C.

8. A process according to claim 1, in which the atomic ratio of Ni/Mg in catalyst component (A) is in the range of 0.5 to 5.0, and the amount of catalyst component (B) is in the range of 10 to 20 wt. % based on the nickel content of catalyst component (A), the reaction pressure being in the range of 50 to 100 kg/cm$^2$ .G, and the temperature of the catalyst being in the range of 400° to 570° C.

9. A process according to claim 8, in which the amount of catalyst component (C) is from 30 to 70 percent by weight, based on the combined weights of (A), (B) and (C).

10. A process according to claim 9 in which said catalyst component (C) is SiC.

11. A process according to claim 9 in which said catalyst component (C) is $\alpha$-quartz.

* * * * *